US011665647B2

(12) United States Patent
Akkarakaran et al.

(10) Patent No.: US 11,665,647 B2
(45) Date of Patent: May 30, 2023

(54) SIDELINK CLOSED-LOOP TRANSMIT POWER CONTROL COMMAND PROCESSING

(71) Applicant: QUALCOMM Incorporated, San Diego, CA (US)

(72) Inventors: Sony Akkarakaran, Poway, CA (US); Tao Luo, San Diego, CA (US); Junyi Li, Chester, NJ (US); Juan Montojo, San Diego, CA (US); Jung Ho Ryu, Fort Lee, NJ (US); Kapil Gulati, Hillsborough, NJ (US); Hong Cheng, Basking Ridge, NJ (US)

(73) Assignee: QUALCOMM Incorporated, San Diego, CA (US)

(*) Notice: Subject to any disclaimer, the term of this patent is extended or adjusted under 35 U.S.C. 154(b) by 285 days.

(21) Appl. No.: 16/947,577

(22) Filed: Aug. 6, 2020

(65) Prior Publication Data

US 2021/0045061 A1 Feb. 11, 2021

Related U.S. Application Data

(60) Provisional application No. 62/884,629, filed on Aug. 8, 2019.

(51) Int. Cl.
*H04W 52/08* (2009.01)
*H04W 52/36* (2009.01)
(Continued)

(52) U.S. Cl.
CPC ........... *H04W 52/08* (2013.01); *H04L 5/0007* (2013.01); *H04L 5/0048* (2013.01); *H04W 52/16* (2013.01);
(Continued)

(58) Field of Classification Search
CPC ... H04W 52/08; H04W 52/16; H04W 52/242; H04W 52/362; H04W 52/221;
(Continued)

(56) References Cited

U.S. PATENT DOCUMENTS 9,961,487 B1* 5/2018 Miao ..................... H04W 4/029
2015/0181546 A1* 6/2015 Freda .................... H04L 5/0051
370/336
(Continued)

FOREIGN PATENT DOCUMENTS

WO 2006064411 A2 6/2006

OTHER PUBLICATIONS

International Search Report and Written Opinion—PCT/US2020/070382—ISA/EPO—dated Nov. 6, 2020.

*Primary Examiner* — Hoang-Chuong Q Vu
(74) *Attorney, Agent, or Firm* — Danai Nelisile Mhembere; Harrity & Harrity, LLP

(57) ABSTRACT

Various aspects of the present disclosure generally relate to wireless communication. In some aspects, a user equipment (UE) may receive, during an accumulation period, a plurality of transmit power control (TPC) commands that are based at least in part on one or more sidelink communications transmitted by the UE. The UE may determine a transmit power adjustment for the UE based at least in part on the plurality of TPC commands. The UE may selectively adjust a transmit power of the UE based at least in part on the transmit power adjustment. Numerous other aspects are provided.

40 Claims, 11 Drawing Sheets

(51) Int. Cl.
  *H04W 52/16*     (2009.01)
  *H04L 5/00*      (2006.01)
  *H04W 52/24*     (2009.01)

(52) U.S. Cl.
  CPC ....... *H04W 52/242* (2013.01); *H04W 52/362* (2013.01)

(58) Field of Classification Search
  CPC . H04W 52/42; H04W 52/383; H04W 52/367; H04W 72/0473; H04W 52/34; H04W 72/042; H04L 5/0007; H04L 5/0048; H04L 5/0053; H04L 5/0055
  See application file for complete search history.

(56) References Cited

U.S. PATENT DOCUMENTS

| | | | |
|---|---|---|---|
| 2016/0014834 A1* | 1/2016 | Chang ................... | H04W 52/18 370/329 |
| 2016/0135143 A1 | 5/2016 | Won et al. | |
| 2016/0142898 A1* | 5/2016 | Poitau ............... | H04W 72/0413 370/329 |
| 2016/0165547 A1* | 6/2016 | Ouchi ...................... | H04L 5/14 455/522 |
| 2016/0353450 A1* | 12/2016 | Miao ...................... | H04W 76/14 |
| 2017/0099641 A1* | 4/2017 | Wang ...................... | H04W 52/10 |
| 2018/0242265 A1* | 8/2018 | Larsson ................ | H04W 52/60 |
| 2019/0230597 A1* | 7/2019 | Akkarakaran ...... | H04W 52/146 |
| 2020/0367172 A1* | 11/2020 | Wernersson ........ | H04W 52/367 |
| 2021/0022084 A1* | 1/2021 | Jiang ...................... | H04L 1/0026 |
| 2021/0037476 A1* | 2/2021 | Ryu ........................ | H04W 4/70 |
| 2021/0410084 A1* | 12/2021 | Li .......................... | H04W 52/265 |
| 2022/0110066 A1* | 4/2022 | Takeda ................. | H04W 52/225 |

* cited by examiner

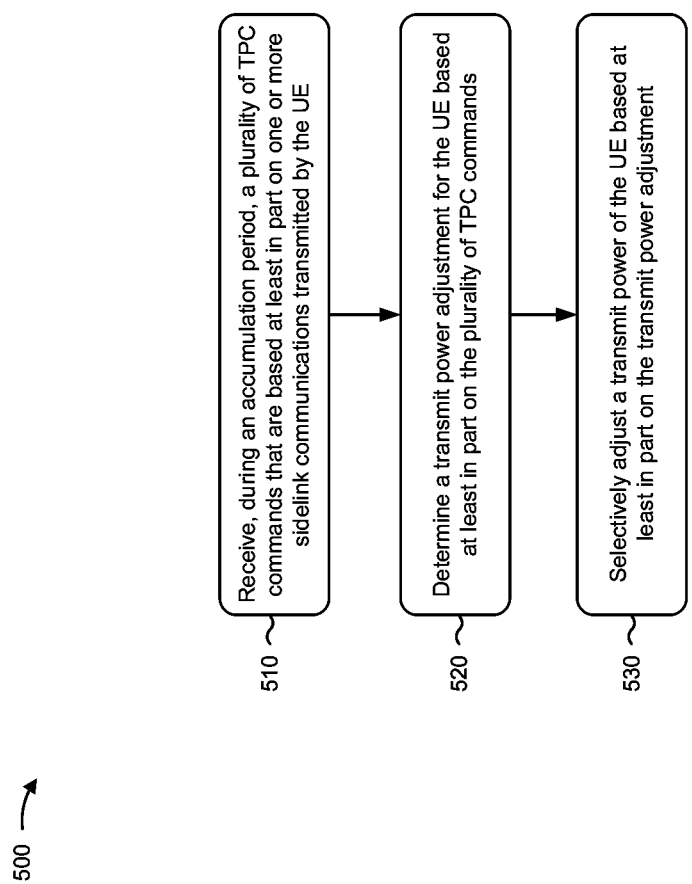

SIDELINK CLOSED-LOOP TRANSMIT POWER CONTROL COMMAND PROCESSING

CROSS-REFERENCE TO RELATED APPLICATION

This Patent Application claims priority to U.S. Provisional Patent Application No. 62/884,629, filed on Aug. 8, 2019, entitled "SIDELINK CLOSED-LOOP TRANSMIT POWER CONTROL COMMAND PROCESSING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sidelink closed-loop transmit power control (TPC) command processing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, during an accumulation period, a plurality of transmit power control (TPC) commands that are based at least in part on one or more sidelink communications transmitted by the UE; determining a transmit power adjustment for the UE based at least in part on the plurality of TPC commands; and selectively adjusting a transmit power of the UE based at least in part on the transmit power adjustment.

In some aspects, a UE for wireless communication may include memory and one or more processors operatively coupled to the memory. The memory and the one or more processors may be configured to receive, during an accumulation period, a plurality of TPC commands that are based at least in part on one or more sidelink communications transmitted by the UE; determine a transmit power adjustment for the UE based at least in part on the plurality of TPC commands; and selectively adjust a transmit power of the UE based at least in part on the transmit power adjustment.

In some aspects, a non-transitory computer-readable medium may store one or more instructions for wireless communication. The one or more instructions, when executed by one or more processors of a UE, may cause the one or more processors to: receive, during an accumulation period, a plurality of TPC commands that are based at least in part on one or more sidelink communications transmitted by the UE; determine a transmit power adjustment for the UE based at least in part on the plurality of TPC commands; and selectively adjust a transmit power of the UE based at least in part on the transmit power adjustment.

In some aspects, an apparatus for wireless communication may include means for receiving, during an accumulation period, a plurality of TPC commands that are based at least in part on one or more sidelink communications transmitted by the apparatus; means for determining a transmit power adjustment for the apparatus based at least in part on the plurality of TPC commands; and means for selectively adjusting a transmit power of the apparatus based at least in part on the transmit power adjustment.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example process performed, for example, by a UE, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
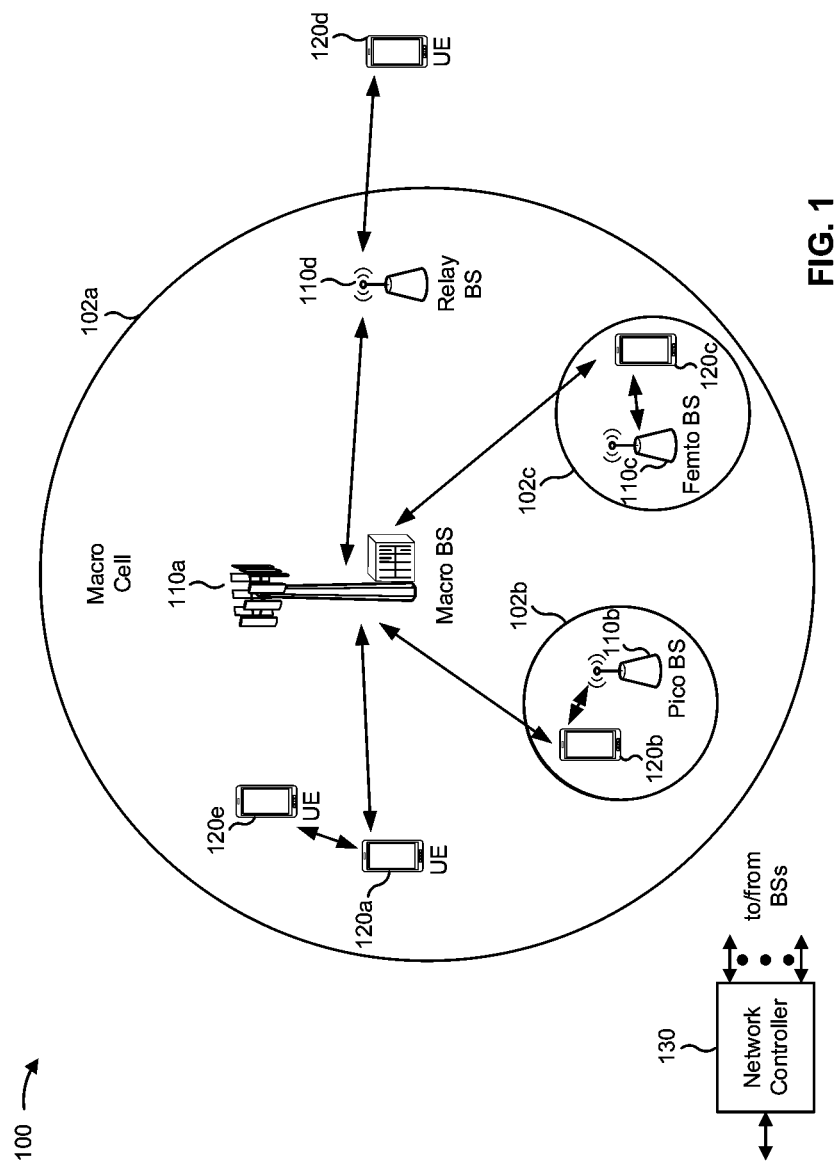
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
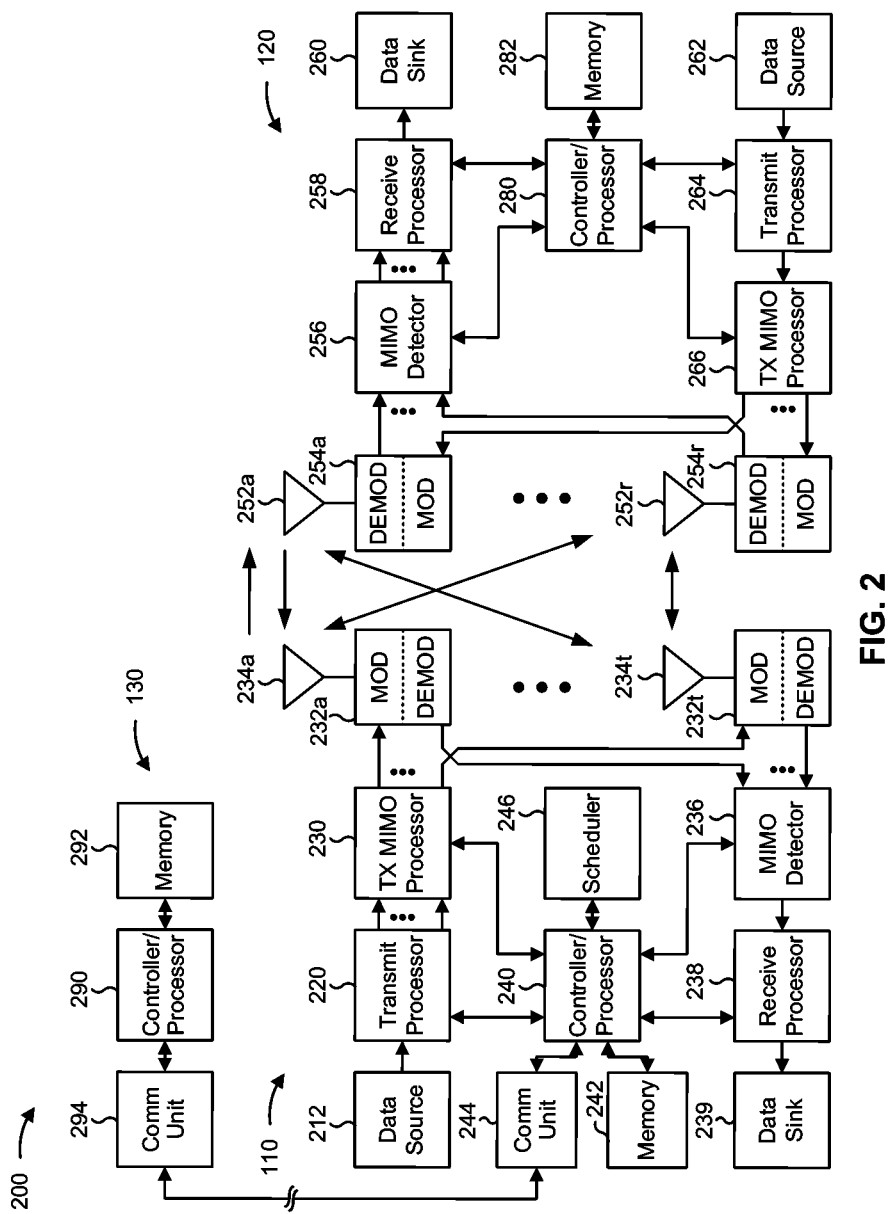
FIG. 2 is a block diagram illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with sidelink closed-loop transmit power control (TPC) command processing, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5 and/or other processes as described herein. A scheduler 246 may schedule UEs for data transmission on the downlink and/or uplink.

In some aspects, UE 120 may include means for receiving, during an accumulation period, a plurality of TPC commands that are based at least in part on one or more sidelink communications transmitted by the UE 120, means for determining a transmit power adjustment for the UE 120 based at least in part on the plurality of TPC commands, means for selectively adjusting a transmit power of the UE 120 based at least in part on the transmit power adjustment, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
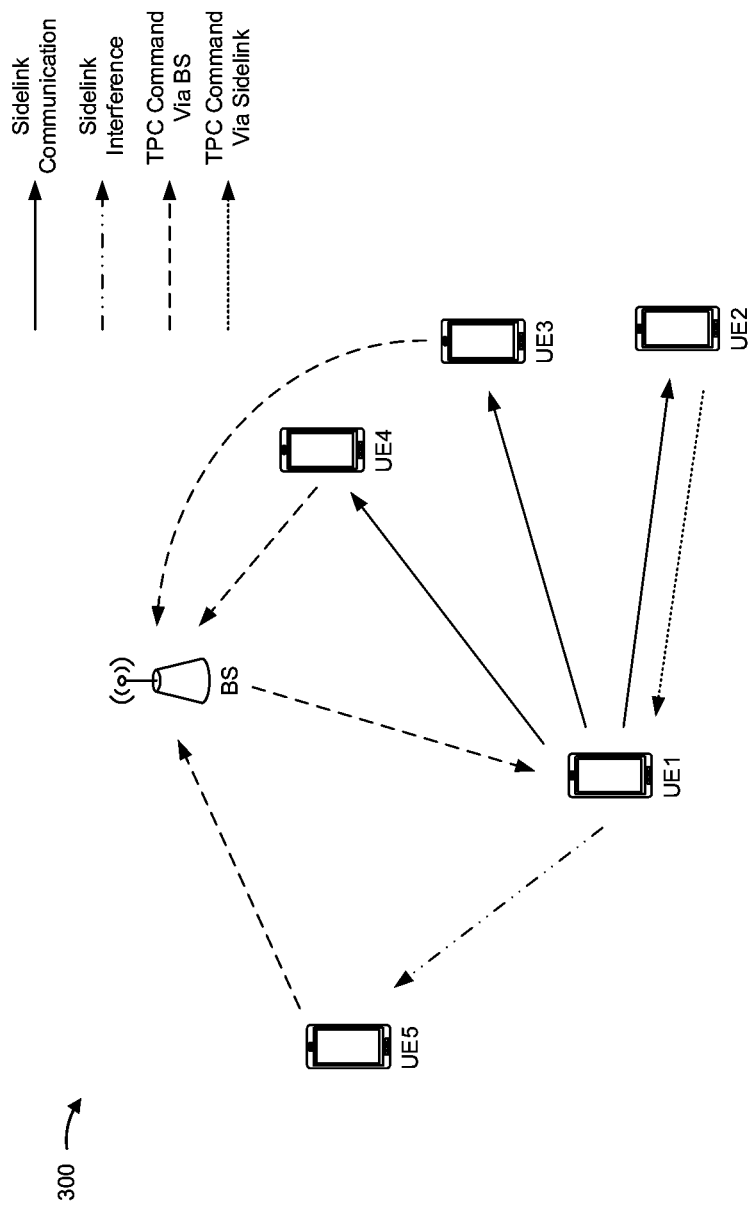
FIG. 3 is a block diagram illustrating one or more examples of a sidelink closed-loop transmit power control (TPC), in accordance with various aspects of the present disclosure.

FIG. 3 is a diagram illustrating one or more examples 300 of sidelink closed-loop TPC, in accordance with various aspects of the present disclosure. As shown in FIG. 3, example(s) 300 may include communication between a plurality of UEs (e.g., UE 120), such as UE1 through UE5, and a BS (e.g., BS 110). The plurality of UEs and the BS may be included in a wireless network, such as wireless network 100 and/or another wireless network. In some aspects, example(s) 300 may include a greater or fewer quantity of UEs, a greater quantity of BSs, and/or the like.

In some aspects, two or more of the UEs may communicate over a sidelink. For example, UE1 may transmit sidelink communications to, and/or receive sidelink communications from, UE2, UE3, UE4, and/or other UEs. In some aspects, one or more of the UEs may communicate over an access link with the BS. For example, one or more of the UEs may transmit uplink communications to the BS, may receive downlink communications from the BS, and/or the like.

In some aspects, the plurality of UEs and the BS may perform one or more actions and/or techniques associated with sidelink closed-loop TPC associated with UE1. Sidelink closed-loop TPC may include performing transmit power control based at least in part on feedback from a receiver of sidelink communications on a sidelink. For example, a UE may receive a sidelink communication from another UE, may perform one or more measurements associated with the sidelink communication (e.g., RSRP, RSSI, RSRQ, CQI, signal to noise ratio (SNR), and/or the like), and may transmit a TPC command to the other UE to provide feedback regarding the transmit power of the sidelink communication. The TPC command may be based at least in part on the results of the one or more measurements, and may be a command to increase the transmit power of the UE (e.g., so that future sidelink communications are transmitted with a greater transmit power), a command to decrease the transmit power of the UE (e.g., so that future sidelink communications are transmitted with lower transmit power), and/or the like.

In some aspects, a UE (e.g., a transmitter UE) may receive a TPC command directly from another UE that generated the TPC command (e.g., a receiver UE) on a sidelink, from one or more relaying UEs between the transmitter UE and the receiver UE, from one or more BSs (e.g., a BS that serves the transmitter UE, a BS that serves the receiver UE, a BS that serves the one or more relaying UEs, and/or the like), and/or the like.

As an example of the above, and as shown in FIG. 3, UE1 may transmit sidelink communications to UE2, UE3, and UE4. As further shown in FIG. 3, UE2 may transmit, based at least in part on the sidelink transmission, a TPC command directly to UE1 via a sidelink. As further shown in FIG. 3, UE3 and UE4 may each transmit, based at least in part on the sidelink transmission, a respective TPC command to the BS, which may relay the TPC commands to UE1 via an access link (e.g., a downlink). In some aspects, the BS may transmit the individual TPC commands to UE1, may consolidate the TPC commands into a single TPC command, may perform additional processing on the TPC commands, and/or the like.

Moreover, UE5 may or may not be radio resource control (RRC) connected with UE1, or may not be monitoring any sidelink transmission from UE1, or may be monitoring only sidelink control transmission from UE1, and UE1 may be monitoring the wireless network for various types of interference, such as sidelink interference, access link interference, and/or the like. In this case, UE5 may receive sidelink interference due to the transmission of the sidelink communications to UE2-UE4. Accordingly, UE5 may perform one or more measurements of the received sidelink interference (e.g., RSRP), may generate a TPC command based at least in part on the results of the one or more measurements, and may transmit the TPC command to UE1 via the BS, via one or more relaying UEs, and/or the like.

In some aspects, UE1 may receive TPC commands in a sidelink communication from another UE. In some aspects, UE1 may receive TPC commands in a downlink communication from the BS. For example, UE1 may receive a TPC command from the BS in a downlink control information (DCI) communication, a medium access control (MAC) control element (MAC-CE), an RRC communication, and/or the like. As another example, UE1 may receive a TPC command in a grant, such as a downlink grant, an uplink grant, a sidelink grant, a configured grant, a dynamic grant, and/or the like.

UE1 may receive the TPC command(s) from one or more of UE2-UE5, from other UEs, and/or from the BS, and may adjust the transmit power of UE1 based at least in part on the TPC commands. For example, UE1 may increase, decrease, or maintain the transmit power based at least in part on a TPC command indicating that UE1 is to increase, decrease, or maintain the transmit power. In some aspects, UE1 may adjust the transmit power for the access link with the BS (e.g., uplink transmit power) based at least in part on a TPC command, may adjust the transmit power for the sidelink with UE2-UE4, and/or the like. In some aspects, UE1 may adjust the transmit power for a particular TPC loop (or TPC loops) based at least in part on a TPC command. In some aspects, the TPC loop may be associated with the uplink, the one or more sidelinks with UE2-UE4, and/or the like. In some aspects, the TPC loop may be associated with a particular channel of the uplink (e.g., physical uplink control channel (PUCCH), physical uplink shared channel (PUSCH), and/or the like), a particular channel of the one or more sidelinks (physical sidelink control channel (PSCCH), physical sidelink shared channel (PSSCH), physical sidelink feedback channel (PSFCH), physical sidelink broadcast channel (PSBCH), and/or the like), and/or the like.

In some aspects, UE1 may increase or decrease the transmit power at a magnitude indicated by the TPC command. For example, a TPC command generated by a receiver UE may identify an adjustment value, which may indicate the magnitude that UE1 is to increase or decrease the transmit power, relative to a scale (e.g., −5 to +5, −1 to +1, −10 to +10, and/or the like). Moreover, the magnitude that UE1 is to increase or decrease the transmit power may be based at least in part on a step size configured for the receiver UE. The step-size may control the increment at which the adjustment value may specified on the scale (e.g., in 1-value increments, in 5-value increments, and/or the like). In other words, the step-size may control the granularity for specifying the adjustment value in a TPC command.

As indicated above, FIG. 3 is provided as one or more examples. Other examples may differ from what is described with regard to FIG. 3.

A transmitter UE may be scheduled to transmit a sidelink communication to one or more receiver UEs. In some cases, the transmitter UE may receive a plurality of TPC commands associated with the sidelink communication from a receiver UE, may receive respective pluralities of TPC commands associated with the sidelink communication from each receiver UE of a plurality of UEs, and/or the like. In these cases, the transmitter UE may be unable to determine which of the TPC commands should be considered when determining a transmit power adjustment for the transmitter UE, may be unable to determine which of the TPC commands should be considered when determining a subsequent transmit power adjustment (e.g., another transmit power adjustment that is determined after the transmit power adjustment), may be unable to determine how to determine the transmit power adjustment based at least in part on the plurality (or pluralities) of TPC commands, and/or the like.

Some aspects described herein provide techniques and apparatuses associated with sidelink closed-loop TPC command processing. In some aspects, a transmitter UE and/or a BS may configure an accumulation period for the transmitter UE. The accumulation period may be a time period configured for receiving TPC commands associated with a sidelink communication. The transmitter UE may transmit the sidelink communication to one or more receiver UEs, and the one or more receiver UEs may provide, to the transmitter UE, TPC commands associated with the sidelink communication. The transmitter UE may determine a transmit power adjustment, for the transmitter UE, based at least in part on TPC commands received during the accumulation period, may determine a subsequent transmit power adjustment based at least in part on TPC commands received after the accumulation period (e.g., in another accumulation period), and/or the like. In this way, the accumulation period permits the transmitter UE to determine which of the TPC commands, associated with the sidelink communication, to consider when determining the transmit power adjustment, permits the transmitter UE to determine which of the TPC commands to consider when determining the subsequent transmit power adjustment, and/or the like.

FIGS. 4A-4G are diagrams illustrating one or more examples 400 of sidelink closed-loop TPC command processing, in accordance with various aspects of the present disclosure. As shown in FIGS. 4A-4G, example(s) 400 may include communication between a plurality of UEs (e.g., UE 120), such as UE1 through UE5, and a BS (e.g., BS 110). The plurality of UEs and the BS may be included in a wireless network, such as wireless network 100 and/or another wireless network. In some aspects, examples 400 may include a greater or fewer quantity of UEs, a greater quantity of BSs, and/or the like.

Figure 4A:
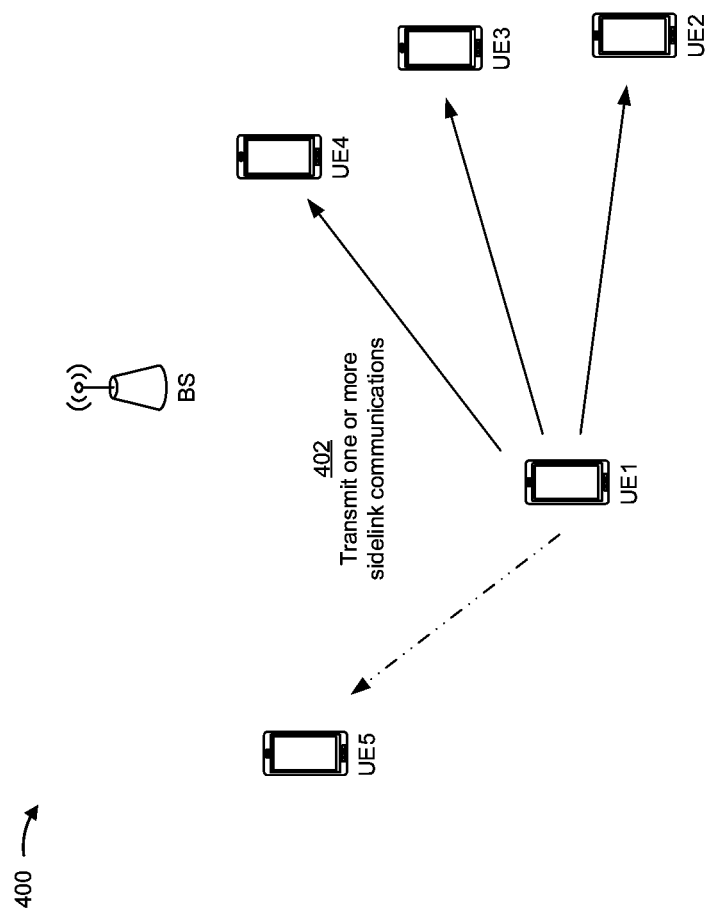
FIGS. 4A-4G are diagrams illustrating one or more examples of sidelink closed-loop TPC command processing, in accordance with various aspects of the present disclosure.

As shown in FIG. 4A, and by reference number 402, UE1 may transmit a sidelink communication to one or more receiver UEs in the wireless network. For example, UE1 may transmit a sidelink communication to UE2, UE3, UE4, and/or other receiver UEs on a PSSCH, a PSCCH, a PSFCH, a PSBCH, and/or the like. In some aspects, UE1 may be scheduled to transmit the sidelink communication. For example, UE1 may receive a sidelink grant from the BS, may receive a sidelink grant from another UE, and/or the like.

In some aspects, the transmission of the sidelink communication may cause interference for one or more other UEs in the wireless network. For example, UE5 may be monitoring the wireless network for interference, and may detect interference caused by the transmission of the sidelink communication.

The receiver UEs (e.g., UE2-UE5) may perform one or more measurements of the sidelink communication, may generate a plurality of TPC commands based at least in part on results of the one or more measurements, and may transmit the plurality of TPC commands to UE1 so that UE1 may perform sidelink closed-loop TPC based at least in part on the plurality of TPC commands.

Figure 4B:
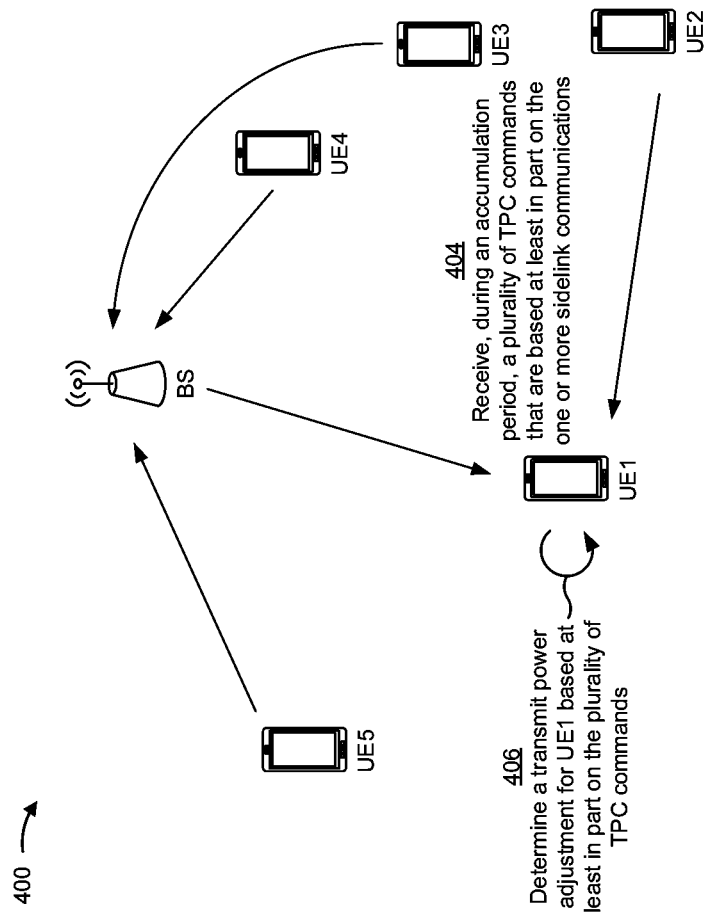

As shown in FIG. 4B, and by reference number 404, UE1 may receive the plurality of TPC commands from the receiver UEs during an accumulation period associated with the sidelink communication. In some aspects, a receiver UE may transmit a TPC command directly to UE1 on a sidelink. In some aspects, a receiver UE may transmit a TPC command to UE1 by relaying the TPC command via the BS and/or another UE, which may transmit the TPC command to UE1. In some aspects, a receiver UE may relay a TPC command for various purposes, such as to reduce latency, if the receiver UE is not RRC connected or connected via a direct sidelink with UE1, if a beam on which the receiver UE communicates with UE1 is blocked, if the receiver UE is transmit power limited on a beam on which the UE is to transmit the TPC command, and/or the like.

The accumulation period may be a time period configured for receiving TPC commands associated with the sidelink communication. In some aspects, the timing of the accumulation period (e.g., a starting OFDM symbol and/or slot of the accumulation period, a time duration of the accumulation period, and/or the like) may be based at least in part on an event associated with UE1, based at least in part on a communication received at UE1, and/or the like. For example, the starting OFDM symbol and/or slot of the accumulation period may be based at least in part on an OFDM symbol and/or slot in which UE1 transmitted the sidelink communication (e.g., the starting OFDM symbol and/or slot may occur a quantity of OFDM symbols and/or slots after the OFDM symbol and/or slot in which UE1 transmitted the sidelink communication).

As another example, the starting OFDM symbol and/or slot of the accumulation period may be based at least in part on a received grant associated with UE1 (e.g., a received grant triggering an uplink transmission, a received grant triggering a sidelink transmission, and/or the like). In the context of power-controlling data (e.g., PUSCH data for uplink or PSSCH/PSCCH data for sidelink), the uplink or sidelink grant may trigger the sidelink transmission being power-controlled. As another example, the starting OFDM symbol and/or slot of the accumulation period may be based at least in part on a grant occasion associated with UE1 (e.g., an access link recurring grant occasion, such as a semi-persistent scheduling (SPS) downlink grant occasion or a configured grant uplink occasion, a sidelink configured grant or SPS occasion, and/or the like). In the context of power-controlling hybrid automatic repeat request (HARQ) acknowledgement/negative acknowledgement (ACK/NACK) or other feedback (e.g., TPC command, scheduling request, and/or the like on PSFCH), a downlink grant or sidelink reception grant may trigger the sidelink transmission being power-controlled. In both cases, the grants may be dynamic (e.g., received via a DCI communication) or semi-static (e.g., RRC-configured, periodic or semi-persistent, as in SPS on the downlink or configured-grant on the uplink).

In some aspects, UE1 may receive a TPC command in a DCI communication, a MAC-CE communication, an RRC communication, a sidelink control information communication, a feedback communication, and/or other types of communications and/or on one or more physical channels. In some aspects, UE1 may determine whether a TPC command was received in the accumulation period based at least in part on a time at which UE1 received the TPC command (e.g., based at least in part on the OFDM symbol in which UE1 received the TPC command), based at least in part on a time at which UE1 received the physical channel on which the TPC command was transmitted (e.g., PDSCH, PDCCH, PSFCH, PSSCH, PSCCH, and/or the like), and/or the like. In some aspects, if UE1 is configured to transmit HARQ feedback (e.g., an ACK) for the communication carrying the TPC command (e.g., a MAC-CE communication and/or another type of communication), UE1 may determine that the TPC command was received based at least in part on a time at which UE1 transmitted the ACK (e.g., based at least in part on the OFDM symbol in which UE1 transmitted the ACK, for example, a fixed time duration (e.g., 3 milliseconds) after the last OFDM symbol and/or last slot of the ACK transmission).

As further shown in FIG. 4B, and by reference number 406, UE1 may determine a transmit power adjustment for UE1 based at least in part on the plurality of TPC commands received during the accumulation period. For example, UE1 may determine the transmit power adjustment based at least in part on whether a TPC command, of the plurality of TPC commands, indicates that UE1 is to increase the transmit power of UE1 or decrease the transmit power of UE1, based at least in part on a magnitude at which the TPC command indicates UE1 is to increase or decrease the transmit power of UE1, and/or the like.

In some aspects, UE1 may determine the magnitude at which a TPC command indicates UE1 is to increase or decrease the transmit power of UE1 based at least in part on an adjustment value indicated in the TPC command and a step size configured for the receiver UE that generated the TPC command. As indicated above, the step size may control the increment at which the adjustment value may be specified on an adjustment scale. In some aspects, the step size configured for a receiver UE may vary from accumulation period to accumulation period and may be based at least in part on whether an accumulation period occurs at the beginning of a sidelink transmission burst of UE1, on whether an accumulation period occurs after a transmit beam or waveform change of UE1, on whether a downlink pathloss estimate is updated prior to or after an accumulation period, and/or the like. As an example, the step size configured for a receiver UE may be greater at the beginning of a sidelink transmission burst or after a transmit beam change to facilitate faster convergence of the transmit power of UE1 to an optimal transmit power than if the step size were static.

In some aspects, UE1 may determine the transmit power adjustment for UE1 by accumulating TPC commands received from UE2-UE5 during the accumulation period. In some aspects, if UE1 receives a plurality of TPC commands during the accumulation period from only one receiver UE, UE1 may determine the transmit power adjustment based at least in part on a combination of the plurality of TPC commands. In this case, the transmit power adjustment may be a summation of the increase or decrease of the transmit power commands, may be a summation of the increase or decrease of the transmit power commands and associated adjustment values, and/or the like. In some aspects, UE1 may determine the transmit power using other techniques, such as by determining an average of the plurality of TPC commands, by selecting the greatest magnitude TPC command, and/or the like.

Figure 4C:
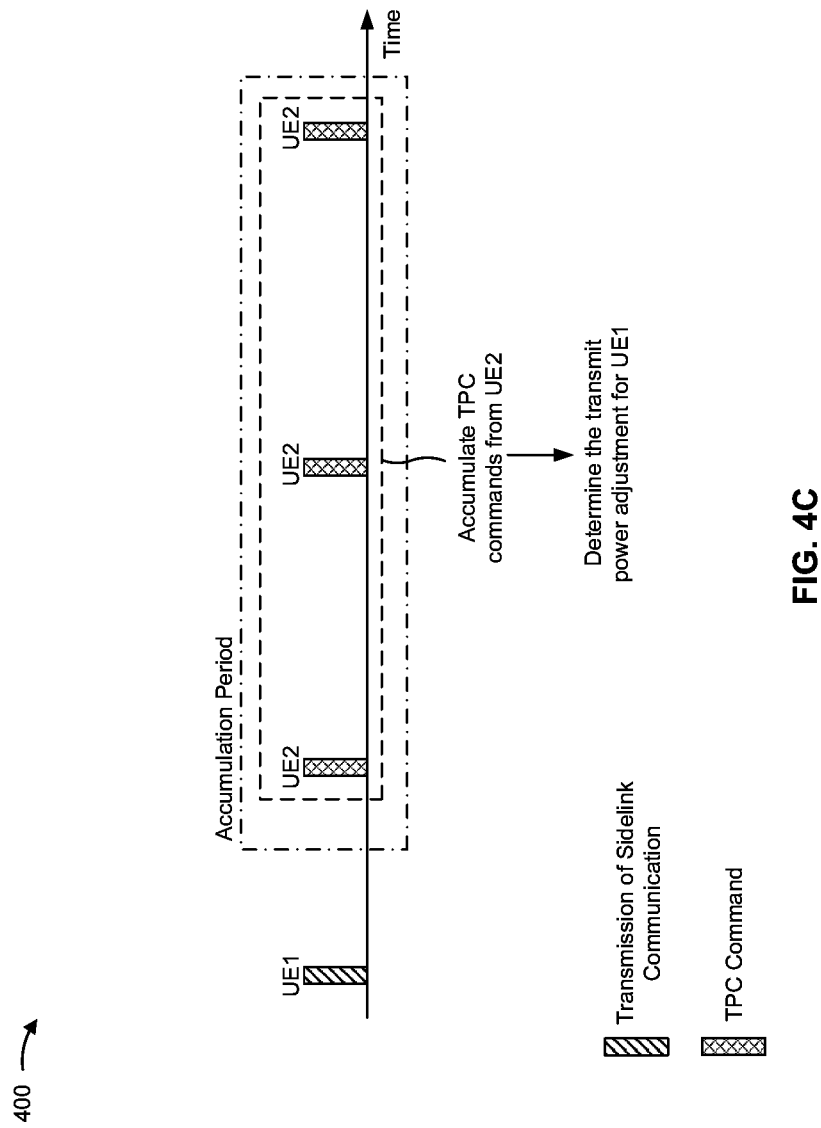

As an example, and as illustrated in FIG. 4C, if UE1 transmits a sidelink communication and receives three TPC commands from UE2 (e.g., an increase transmit power command, an increase transmit power command, and a decrease transmit power command) during an accumulation period, UE1 may determine the transmit power adjustment as an increase to the transmit power of UE1 by one step. As another example, if the three TPC commands respectively indicate an increase transmit power command by two steps, an increase transmit power command by one step, and a decrease transmit power command by one step, UE1 may determine the transmit power adjustment as an increase to the transmit power of UE1 by two steps. In some aspects, if UE1 receives two or more TPC commands that are configured with different step sizes, UE1 may convert the adjustment values to a normalized step size and determine the transmit power adjustment based at least in part on the normalized step size.

In some aspects, if UE1 receives a plurality of TPC commands during the accumulation period from a plurality of receiver UEs, UE1 may determine the transmit power adjustment based at least in part on separately accumulating or summing the plurality of TPC commands for each receiver UE to determine respective transmit power adjustments for each UE. In this case, UE1 may select the transmit power adjustment for UE1 as the greatest magnitude transmit power adjustment of the respective transmit power adjustments, may determine the transmit power adjustment for UE1 as an average of the respective transmit power adjustments, may determine the transmit power adjustment by summing the respective transmit power adjustments, by considering the most recently received TPC command that resulted in these adjustments, and/or the like. Further, the determination of transmit power adjustment may account for the sources of the received TPC commands, for example, commands received from a BS may supersede those received from a UE.

Figure 4D:
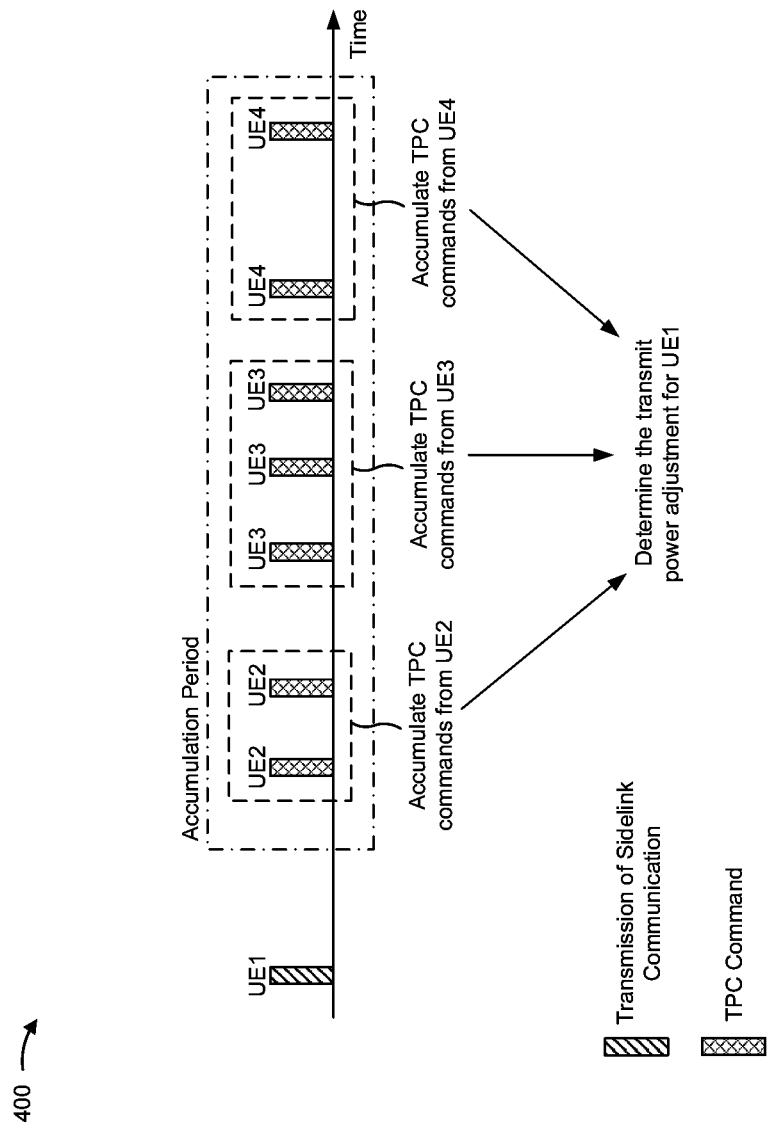

As an example, and as illustrated in FIG. 4D, if UE1 transmits a sidelink communication and receives two TPC commands from UE2, three TPC commands from UE2, and two TPC commands from UE4 during an accumulation period, UE1 may individually accumulate and sum the TPC commands from UE2, may individually accumulate and sum the TPC commands from UE3, and may individually accumulate and sum the TPC commands from UE4. UE1 may determine respective transmit power adjustments for each of UE2, UE3, and UE4 based on the respective TPC command accumulations, and may determine the transmit power adjustment for UE1 based at least in part on the respective transmit power adjustments for each of UE2, UE3, and UE4.

In some aspects, an accumulation for a sidelink communication may be partitioned into a plurality of accumulation sub-periods, which may provide a more granular transmit power adjustment. In some aspects, the plurality of accumulation sub-periods may be configured such that the plurality of accumulation sub-periods are of the same time duration (e.g., same quantity of OFDM symbols and/or slots). In some aspects, the plurality of accumulation sub-periods may be configured such that two or more of the plurality of accumulation sub-periods are different time durations (e.g., different quantities of OFDM symbols and/or slots). In some aspects, the plurality of accumulation sub-periods may be configured such that in each accumulation sub-period of the plurality of accumulation sub-periods, at least one TPC command is received from each receiver that generated at least one TPC command within the accumulation period.

In some aspects, UE1 may receive TPC commands from one or more UEs in each accumulation sub-period. UE1 may determine respective transmit power adjustments (or respective sets of transmit power adjustments), using one or more of the techniques described above, for each accumulation sub-period, and may perform additional processing to select or determine the transmit power adjustment for UE1 based at least in part on the respective transmit power adjustments (or respective sets of transmit power adjustments).

Figure 4E:
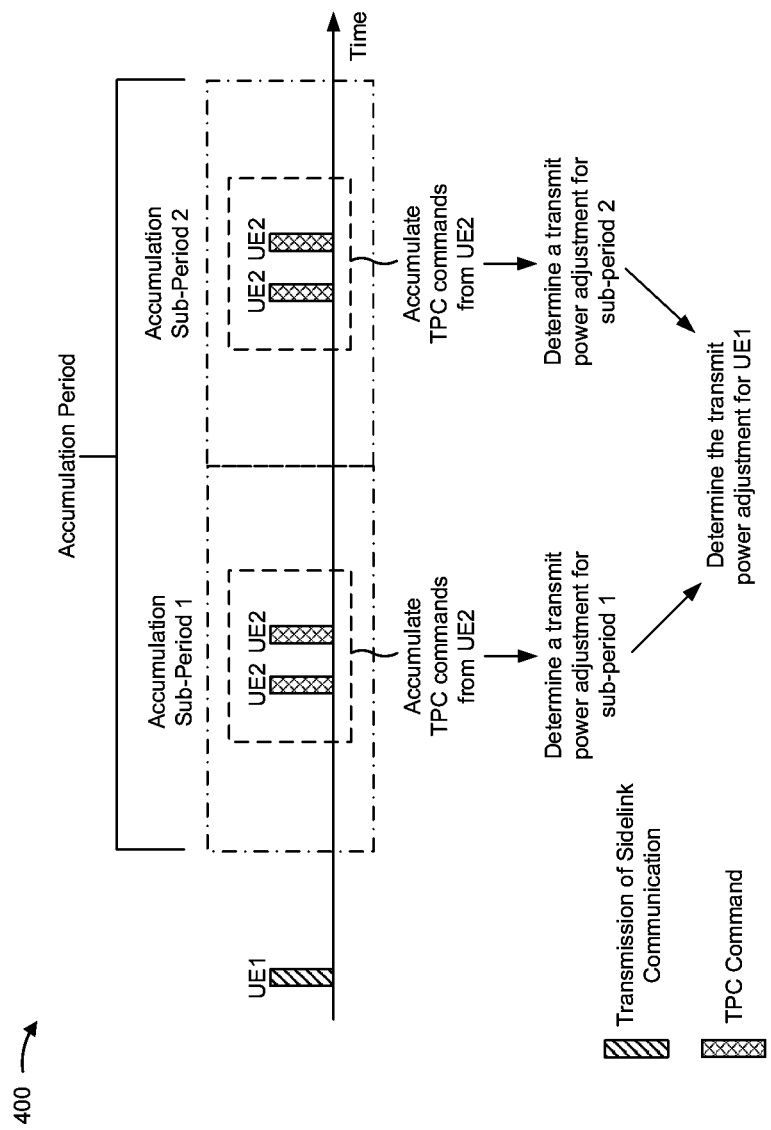

As an example, and as illustrated in FIG. 4E, UE1 may transmit a sidelink communication and may receive two TPC commands in accumulation sub-period 1 from UE2 and two TPC commands in accumulation sub-period 2 from UE2. In this case, UE1 may accumulate the TPC commands received in accumulation sub-period 1 and may determine a transmit power adjustment for accumulation sub-period 1 based at least in part on the accumulated TPC commands. Similarly, UE1 may accumulate the TPC commands received in accumulation sub-period 2 and may determine a transmit power adjustment for accumulation sub-period 2 based at least in part on the accumulated TPC commands.

UE1 may select or determine the transmit power adjustment for UE1 based at least in part on the transmit power adjustment for accumulation sub-period 1 and the transmit power adjustment for accumulation sub-period 2. For example, UE1 may select the transmit power adjustment for UE1 as the transmit power adjustment with the greatest magnitude. As another example, UE1 may determine the transmit power adjustment for UE1 by summing the transmit power adjustment for accumulation sub-period 1 and the transmit power adjustment for accumulation sub-period 2. As another example, UE1 may determine the transmit power adjustment for UE1 by determining the average of the transmit power adjustment for accumulation sub-period 1 and the transmit power adjustment for accumulation sub-period 2.

Figure 4F:
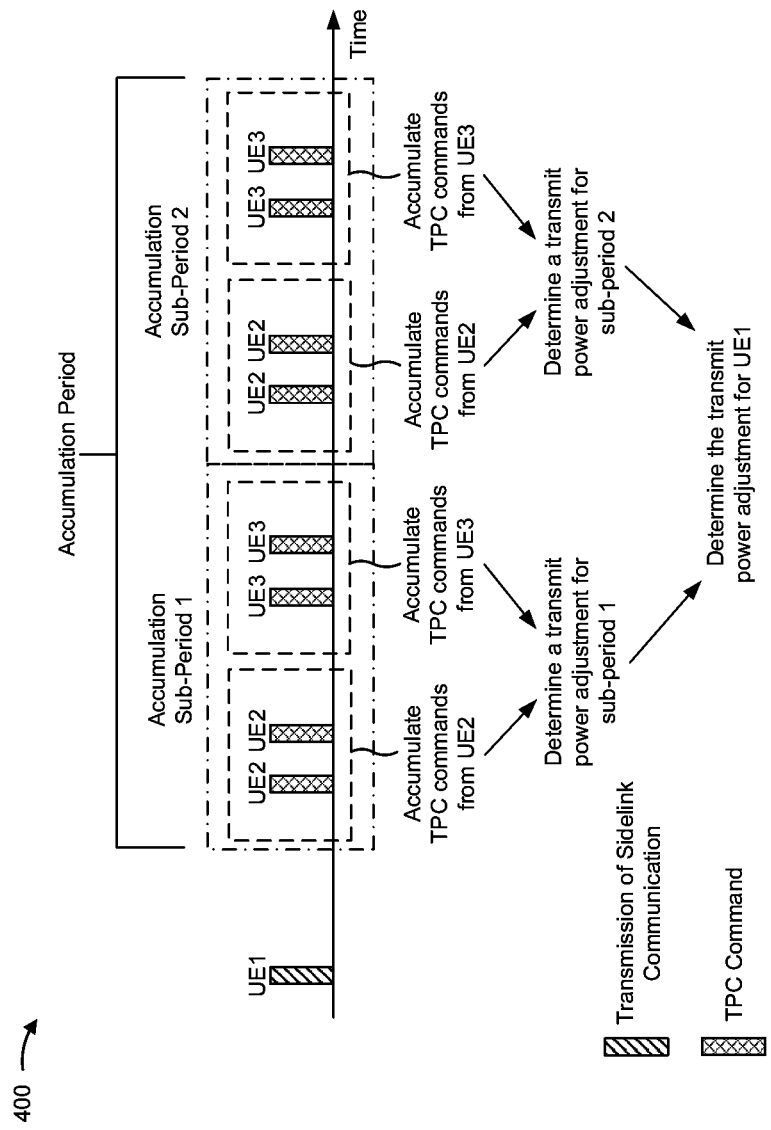

As an example, and as illustrated in FIG. 4F, UE1 may transmit a sidelink communication and may receive two TPC commands in accumulation sub-period 1 from each of UE2 and UE3, and two TPC commands in accumulation sub-period 2 from each of UE2 and UE3. In this case, UE1 may separately accumulate the TPC commands received in accumulation sub-period 1 for each of UE2 and UE3 (e.g., may separately sum the TPC commands for each of UE2 and UE3, may select the greatest magnitude TPC command from the TPC commands for each of UE2 and UE3, may separately determine an average of the TPC commands for each of UE2 and UE3, and/or the like) and may determine a transmit power adjustment for accumulation sub-period 1 based at least in part on the separately accumulated TPC commands for each of UE2 and UE3 (e.g., may select the accumulated TPC commands that have the greatest magnitude, that have the greatest average, and/or the like). Similarly, UE1 may separately accumulate the TPC commands received in accumulation sub-period 2 for each of UE2 and UE3 and may determine a transmit power adjustment for accumulation sub-period 2 based at least in part on the separately accumulated TPC commands for each of UE2 and UE3.

UE1 may select or determine the transmit power adjustment for UE1 based at least in part on the transmit power adjustment for accumulation sub-period 1 and the transmit power adjustment for accumulation sub-period 2. For example, UE1 may select transmit power adjustment for UE1 as the transmit power adjustment with the greatest magnitude. As another example, UE1 may determine the transmit power adjustment for UE1 by summing the transmit power adjustment for accumulation sub-period 1 and the transmit power adjustment for accumulation sub-period 2. As another example, UE1 may determine the transmit power adjustment for UE1 by determining the average of the transmit power adjustment for accumulation sub-period 1 and the transmit power adjustment for accumulation sub-period 2.

Note that although FIGS. 4C-4F shows TPC commands arriving in a particular order (e.g., all commands from UE2, followed by those from UE3 and then UE4 in the example illustrated in FIG. 4D, for example), this is only illustrative and not necessary. The techniques described in connection with FIGS. 4A-4F may be applied regardless of the ordering of the TPC commands, such as the commands from each source (e.g., UE2, UE3 and UE4) are accumulated separately over an accumulation period, and then combined by one of various methods described herein (such as taking the maximum or most recent value, and/or the like). Also, although all the receivers that generated TPC commands are UEs in the examples illustrated in FIGS. 4C-4F, the same concept may apply even if some or all of them are base stations instead.

Figure 4G:
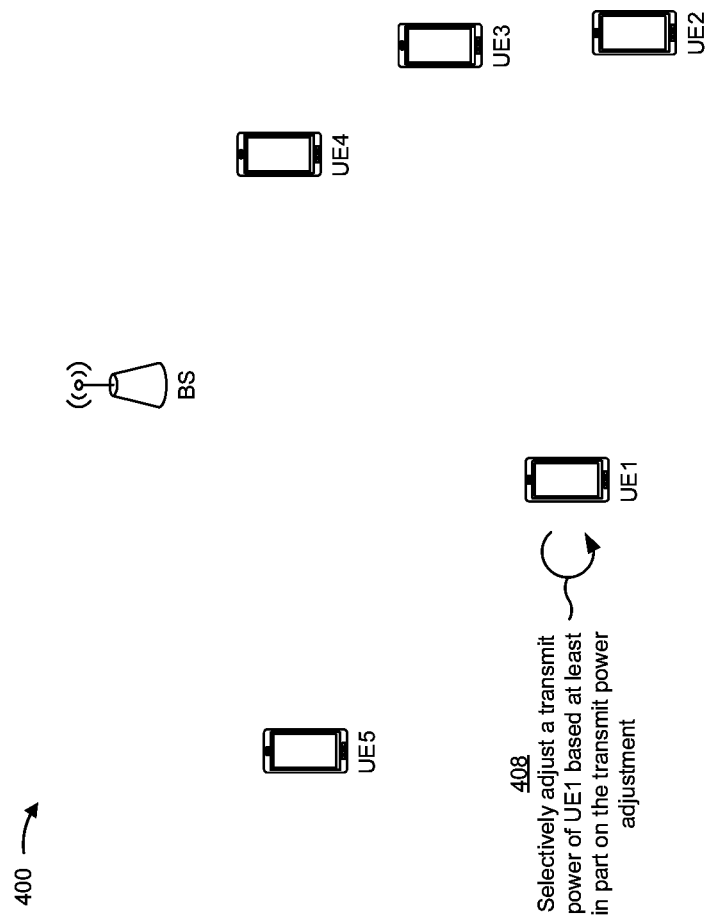

As shown in FIG. 4G, and by reference number 408, UE1 may selectively adjust the transmit power of UE1 based at least in part on the transmit power adjustment for UE1. For example, UE1 may increase the transmit power of UE1 based at least in part on the transmit power adjustment, may increase the transmit power of UE1 based at least in part on the magnitude of the transmit power adjustment, and/or the like. As another example, UE1 may decrease the transmit power of UE1 based at least in part on the transmit power adjustment, may decrease the transmit power of UE1 based at least in part on the magnitude of the transmit power adjustment, and/or the like.

In some aspects, UE1 may adjust the transmit power of UE1 for a particular TPC loop based at least in part on the transmit power adjustment. For example, the TPC loop may be associated with the transmission of the sidelink communication. In some aspects, UE1 may determine the TPC loop based at least in part on a TPC loop index associated with the TPC loop. In this case, UE1 may determine the TPC loop index based at least in part on a sounding reference signal resource indicator (SRI) associated with the transmission of the sidelink communication, a channel state information reference signal resource indicator (CRI) associated with the transmission of the sidelink communication, a waveform type associated with the transmission of the sidelink communication, and/or the like. The waveform type may include, for example, a cyclic-prefix OFDM (CP-OFDM) waveform, a discrete Fourier transform spread OFDM (DFT-s-OFDM) waveform, and/or other types of waveforms.

In some aspects, UE1 may selectively adjust the transmit power of UE1 by refraining from adjusting the transmit power of UE1 in order to "freeze" the transmit power of the UE1 at the current transmit power setting. As an example, UE1 may determine to refrain from increasing the transmit power of UE1 based at least in part on determining that the transmit power of UE1 is already set to a maximum permitted transmit power for UE1, a maximum transmit power capability of UE1, and/or the like. As another example, UE1 may determine to refrain from adjusting the transmit power of UE1 based at least in part on determining that the transmit power adjustment would cause the transmit power of UE1 to exceed the maximum permitted transmit power for UE1, the maximum transmit power capability of UE1, and/or the like. Similarly, UE1 may determine to refrain from reducing the transmit power of UE1 if UE1 is already transmitting at the minimum supported nonzero transmit power.

In some aspects, UE1 may reset the transmit power adjustment of UE1, the transmit power of UE1 (e.g., to an open-loop transmit power setting), and/or the like periodically and/or based at least in part on an event. For example, UE1 may reset the transmit power adjustment and/or the transmit power at the beginning of a new sidelink transmission burst of the UE. As another example, UE1 may reset the transmit power adjustment and/or the transmit power based at least in part on UE1 changing to a new transmit beam and/or a new waveform. As another example, UE1 may reset the transmit power adjustment and/or the transmit power based at least in part on receiving an instruction (e.g., from the BS, from a receiver UE, and/or the like) to reset the transmit power adjustment and/or the transmit power of UE1.

In this way, UE1 and/or the BS may configure or determine an accumulation period for UE1. The accumulation period may be a time period configured for receiving TPC commands associated with a sidelink communication. UE1 may transmit the sidelink communication to one or more receiver UEs (e.g., UE2-UE5 and/or other UEs), and the one or more receiver UEs may provide, to UE1, TPC commands associated with the sidelink communication. UE1 may determine a transmit power adjustment, for UE1, based at least in part on TPC commands received during the accumulation period, may determine a subsequent transmit power adjustment based at least in part on TPC commands received after the accumulation period (e.g., in another accumulation period), and/or the like. In this way, the accumulation period permits UE1 to determine which of the TPC commands, associated with the sidelink communication, to consider when determining the transmit power adjustment, permits UE1 to determine which of the TPC commands to consider when determining the subsequent transmit power adjustment, and/or the like.

As indicated above, FIGS. 4A-4G are provided as one or more examples. Other examples may differ from what is described with respect to FIGS. 4A-4G.

FIG. 5 is a diagram illustrating an example process 500 performed, for example, by a UE, in accordance with various aspects of the present disclosure. Example process 500 is an example where a UE (e.g., UE 120) performs operations associated with sidelink closed-loop TPC command processing.

As shown in FIG. 5, in some aspects, process 500 may include receiving, during an accumulation period, a plurality of TPC commands that are based at least in part on one or more sidelink communications transmitted by the UE (block 510). For example, the UE (e.g., using receive processor 258, transmit processor 264, controller/processor 280, memory 282, and/or the like) may receive, during an accumulation period, a plurality of TPC commands that are based at least in part on one or more sidelink communications transmitted by the UE, as described above.

As further shown in FIG. 5, in some aspects, process 500 may include determining a transmit power adjustment for the UE based at least in part on the plurality of TPC commands (block 520). For example, the UE (e.g., using receive processor 258, transmit processor 264, controller/processor 280, memory 282, and/or the like) may determine a transmit power adjustment for the UE based at least in part on the plurality of TPC commands, as described above.

As further shown in FIG. 5, in some aspects, process 500 may include selectively adjusting a transmit power of the UE based at least in part on the transmit power adjustment (block 530). For example, the UE (e.g., using receive processor 258, transmit processor 264, controller/processor 280, memory 282, and/or the like) may selectively adjust a transmit power of the UE based at least in part on the transmit power adjustment, as described above.

Process 500 may include additional aspects, such as any single aspect or any combination of aspects described below and/or in connection with one or more other processes described elsewhere herein.

In a first aspect, the plurality of TPC commands are associated with another UE, and determining the transmit power adjustment for the UE comprises determining the transmit power adjustment for the UE based at least in part on a combination of the plurality of TPC commands. In a second aspect, alone or in combination with the first aspect, the UE is a first UE, a first subset of the plurality of TPC commands is associated with a second UE, a second subset of the plurality of TPC commands is associated with a third UE, and determining the transmit power adjustment for the UE comprises determining a first transmit power adjustment based at least in part on the first subset, determining a second transmit power adjustment based at least in part on the second subset, and selecting the first transmit power adjustment or the second transmit power adjustment as the transmit power adjustment for the UE.

In a third aspect, alone or in combination with one or more of the first and second aspects, receiving the plurality of TPC commands comprises receiving the plurality of TPC commands from at least one of a BS or another UE. In a fourth aspect, alone or in combination with one or more of the first through third aspects, a timing of the accumulation period is based at least in part on at least one of: a received grant triggering an uplink transmission, a received grant triggering a sidelink transmission, an access link recurring grant occasion, or a sidelink configured grant occasion.

In a fifth aspect, alone or in combination with one or more of the first through fourth aspects, the UE is a first UE, the accumulation period includes a plurality of accumulation sub-periods, receiving the plurality of TPC commands comprises receiving a first subset of the plurality of TPC commands, associated with a second UE, in a first accumulation sub-period of the plurality of accumulation sub-periods, receiving a second subset of the plurality of TPC commands, associated with a third UE, in the first accumulation sub-period, receiving a third subset of the plurality of TPC commands, associated with the second UE, in a second accumulation sub-period of the plurality of accumulation sub-periods, and receiving a fourth subset of the plurality of TPC commands, associated with the third UE, in the second accumulation sub-period, and determining the transmit power adjustment for the UE comprises determining a first transmit power adjustment for the first accumulation sub-period based at least in part on the first subset and the second subset, determining a second transmit power adjustment for the second accumulation sub-period based at least in part on the third subset and the fourth subset, and determining the transmit power adjustment for the UE based at least in part on the first transmit power adjustment and the second transmit power adjustment.

In a sixth aspect, alone or in combination with one or more of the first through fifth aspects, the first accumulation sub-period and the second accumulation sub-period include a same quantity of OFDM symbols. In a seventh aspect, alone or in combination with one or more of the first through sixth aspects, the first accumulation sub-period and the second accumulation sub-period include different quantities of OFDM symbols. In an eighth aspect, alone or in combination with one or more of the first through seventh aspects, a quantity of TPC commands in each of the first subset, the second subset, the third subset, and the fourth subset is one TPC command.

In a ninth aspect, alone or in combination with one or more of the first through eighth aspects, receiving the plurality of TPC commands comprises receiving a TPC command of the plurality of TPC commands in a MAC-CE, and process 500 further comprises determining whether the TPC command was received during the accumulation period based at least in part on at least one of a time at which a physical downlink channel carrying the MAC-CE was received, a time at which a physical shared channel carrying the MAC-CE was received, or a time at which an acknowledgement for the MAC-CE was transmitted.

In a tenth aspect, alone or in combination with one or more of the first through ninth aspects, the transmit power adjustment for the UE is to increase the transmit power of the UE, and selectively adjusting the transmit power of the UE comprises refraining from increasing the transmit power based at least in part on determining that the transmit power of the UE is set to a maximum permitted transmit power for the UE. In an eleventh aspect, alone or in combination with one or more of the first through tenth aspects, process 500 further comprises resetting the transmit power adjustment for the UE based at least in part on at least one of a beginning of a sidelink transmission burst of the UE, or a change to a transmit beam of the UE.

In a twelfth aspect, alone or in combination with one or more of the first through eleventh aspects, process 500 further comprises receiving, during another accumulation period after the accumulation period, a plurality of other TPC commands that are based at least in part on one or more other sidelink communications transmitted by the UE, and a TPC step size of the plurality of TPC commands is greater relative to a TPC step size of the plurality of other TPC commands based at least in part on at least one of: the accumulation period occurring at a beginning of a sidelink transmission burst of the UE, the accumulation period occurring after a transmit beam change of the UE, or an updated downlink pathloss estimate between the accumulation period and the other accumulation period. In a thirteenth aspect, alone or in combination with one or more of the first through twelfth aspects, the transmit power adjustment for the UE is associated with a TPC loop that is based at least in part on a TPC loop index associated with transmission of the one or more sidelink communications, and the TPC loop index is indicated by at least one of: a sounding reference signal resource indicator associated with the transmission of the one or more sidelink communications, a channel state information reference signal resource indicator associated with the transmission of the one or more sidelink communications, or a waveform type associated with the transmission of the one or more sidelink communications.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first user equipment (UE), comprising:
    receiving, during an accumulation period and based at least in part on one or more sidelink communications transmitted by the first UE, a plurality of transmit power control (TPC) commands;
    determining a first transmit power adjustment for the first UE, based at least in part on accumulating a first subset of the plurality of TPC commands being associated with a second UE, and a second transmit power adjustment for the first UE based at least in part on accumulating a second subset of the plurality of TPC commands being associated with a third UE; and
    selectively adjusting a transmit power of the first UE based at least in part on at least one of the first transmit power adjustment or the second transmit power adjustment.

2. The method of claim 1, wherein the first subset of the plurality of TPC commands comprises a first plurality of TPC commands associated with the second UE and the second subset of the plurality of TPC commands comprises a second plurality of TPC commands associated with the third UE; and
    wherein determining the first transmit power adjustment and the second transmit power adjustment for the first UE comprises:
        determining the first transmit power adjustment for the first UE, based at least in part on a combination of the first plurality of TPC commands, and the second transmit power adjustment for the first UE based at least in part on a combination of the second plurality of TPC commands.

3. The method of claim 1, further comprising:
    selecting the first transmit power adjustment or the second transmit power adjustment as the transmit power adjustment for the UE.

4. The method of claim 1, wherein receiving the plurality of TPC commands comprises:
    receiving the plurality of TPC commands from at least one of:
    network node, or
    one or more other UEs including the second UE or the third UE.

5. The method of claim 1, wherein a timing of the accumulation period is based at least in part on at least one of:
    a received grant triggering an uplink transmission,
    a received grant triggering a sidelink transmission,
    an access link recurring grant occasion, or
    a sidelink configured grant occasion.

6. The method of claim 1, wherein the accumulation period includes a plurality of accumulation sub-periods;
    wherein receiving the plurality of TPC commands comprises:
        receiving the first subset of the plurality of TPC commands in a first accumulation sub-period of the plurality of accumulation sub-periods,
        receiving the second subset of the plurality of TPC commands, in the first accumulation sub-period,
        receiving a third subset of the plurality of TPC commands, associated with the second UE, in a second accumulation sub-period of the plurality of accumulation sub-periods, and
        receiving a fourth subset of the plurality of TPC commands, associated with the third UE, in the second accumulation sub-period; and
    wherein the method further comprises:
        determining a total transmit power adjustment for the first UE based at least in part on the first transmit power adjustment and the second transmit power adjustment.

7. The method of claim 6, wherein the first accumulation sub-period and the second accumulation sub-period include a same quantity of orthogonal frequency division multiplexing (OFDM) symbols.

8. The method of claim 6, wherein the first accumulation sub-period and the second accumulation sub-period include different quantities of OFDM symbols.

9. The method of claim 6, wherein a quantity of TPC commands in each of the first subset, the second subset, the third subset, and the fourth subset is one TPC command.

10. The method of claim 1, wherein receiving the plurality of TPC commands comprises:
    receiving a TPC command of the plurality of TPC commands in a medium access control (MAC) control element (MAC-CE); and
    wherein the method further comprises:
        determining whether the TPC command was received during the accumulation period based at least in part on at least one of:
        a time at which a physical downlink channel carrying the MAC-CE was received,
        a time at which a physical shared channel carrying the MAC-CE was received, or
        a time at which an acknowledgement for the MAC-CE was transmitted.

11. The method of claim 1, wherein at least one of the first transmit power adjustment or the second transmit power adjustment for the first UE is to increase the transmit power of the first UE; and
wherein selectively adjusting the transmit power of the first UE comprises:
refraining from increasing the transmit power based at least in part on determining that the transmit power of the first UE is set to a maximum permitted transmit power for the first UE.

12. The method of claim 1, further comprising:
resetting at least one of the first transmit power adjustment or the second transmit power adjustment for the first UE based at least in part on at least one of:
a beginning of a sidelink transmission burst of the first UE, or
a change to a transmit beam of the first UE.

13. The method of claim 1, further comprising:
receiving, during another accumulation period after the accumulation period, a plurality of other TPC commands that are based at least in part on one or more other sidelink communications transmitted by the first UE,
wherein a TPC step size of the plurality of TPC commands is greater relative to a TPC step size of the plurality of other TPC commands based at least in part on at least one of:
the accumulation period occurring at a beginning of a sidelink transmission burst of the first UE,
the accumulation period occurring after a transmit beam change of the first UE, or
an updated downlink pathloss estimate between the accumulation period and the other accumulation period.

14. The method of claim 1, wherein at least one of the first transmit power adjustment or the second transmit power adjustment for the first UE is associated with a TPC loop that is based at least in part on a TPC loop index associated with transmission of the one or more sidelink communications,
wherein the TPC loop index is indicated by at least one of:
a sounding reference signal resource indicator associated with the transmission of the one or more sidelink communications,
a channel state information reference signal resource indicator associated with the transmission of the one or more sidelink communications, or
a waveform type associated with the transmission of the one or more sidelink communications.

15. A first user equipment (UE) for wireless communication, comprising:
a memory; and
one or more processors coupled to the memory, the one or more processors configured to:
receive, during an accumulation period and based at least in part on one or more sidelink communications transmitted by the first UE, a plurality of transmit power control (TPC) commands;
determine a first transmit power adjustment for the first UE, based at least in part on accumulating a first subset of the plurality of TPC commands being associated with a second UE, and a second transmit power adjustment for the first UE based at least in part on accumulating a second subset of the plurality of TPC commands being associated with a third UE; and
selectively adjust a transmit power of the first UE based at least in part on the first transmit power adjustment or the second transmit power adjustment.

16. The first UE of claim 15, wherein the first subset of the plurality of TPC commands comprises a first plurality of TPC commands associated with the second UE and the second subset of the plurality of TPC commands comprises a second plurality of TPC commands associated with the third UE; and
wherein the one or more processors, when determining the first transmit power adjustment and the second transmit power adjustment for the first UE, are configured to:
determine the first transmit power adjustment for the first UE, based at least in part on a combination of the first plurality of TPC commands, and the second transmit power adjustment for the first UE based at least in part on a combination of the second plurality of TPC commands.

17. The first UE of claim 15, wherein the one or more processors are further configured to:
select the first transmit power adjustment or the second transmit power adjustment as the transmit power adjustment for the UE.

18. The first UE of claim 15, wherein the one or more processors, when receiving the plurality of TPC commands, are configured to:
receive the plurality of TPC commands from at least one of:
network node, or
one or more other UEs.

19. The first UE of claim 15, wherein a timing of the accumulation period is based at least in part on at least one of:
a received grant triggering an uplink transmission,
a received grant triggering a sidelink transmission,
an access link recurring grant occasion, or
a sidelink configured grant occasion.

20. The first UE of claim 15, wherein the accumulation period includes a plurality of accumulation sub-periods;
wherein the one or more processors, when receiving the plurality of TPC commands, are configured to:
receive the first subset of the plurality of TPC commands in a first accumulation sub-period of the plurality of accumulation sub-periods,
receive the second subset of the plurality of TPC commands in the first accumulation sub-period,
receive a third subset of the plurality of TPC commands, associated with the second UE, in a second accumulation sub-period of the plurality of accumulation sub- periods, and
receive a fourth subset of the plurality of TPC commands, associated with the third UE, in the second accumulation sub-period; and
wherein the one or more processors are further configured to:
determine a total transmit power adjustment for the first UE based at least in part on the first transmit power adjustment and the second transmit power adjustment.

21. The first UE of claim 20, wherein the first accumulation sub-period and the second accumulation sub-period include a same quantity of orthogonal frequency division multiplexing (OFDM) symbols.

22. The first UE of claim 20, wherein the first accumulation sub-period and the second accumulation sub-period include different quantities of OFDM symbols.

23. The first UE of claim 20, wherein a quantity of TPC commands in each of the first subset, the second subset, the third subset, and the fourth subset is one TPC command.

24. The first UE of claim 15, wherein the one or more processors, when receiving the plurality of TPC commands, are configured to:
receive a TPC command of the plurality of TPC commands in a medium access control (MAC) control element (MAC-CE); and
wherein the one or more processors are further configured to:
determine whether the TPC command was received during the accumulation period based at least in part on at least one of:
a time at which a physical downlink channel carrying the MAC-CE was received,
a time at which a physical shared channel carrying the MAC-CE was received, or
a time at which an acknowledgement for the MAC-CE was transmitted.

25. The first UE of claim 15, wherein at least one of the first transmit power adjustment or the second transmit power adjustment for the first UE is to increase the transmit power of the first UE; and
wherein the one or more processors, when selectively adjusting the transmit power of the first UE, are configured to:
refrain from increasing the transmit power based at least in part on determining that the transmit power of the first UE is set to a maximum permitted transmit power for the first UE.

26. The first UE of claim 15, wherein the one or more processors are further configured to:
reset at least one of the first transmit power adjustment or the second transmit power adjustment for the first UE based at least in part on at least one of:
a beginning of a sidelink transmission burst of the first UE, or
a change to a transmit beam of the first UE.

27. The first UE of claim 15, wherein the one or more processors are further configured to:
receive, during another accumulation period after the accumulation period, a plurality of other TPC commands that are based at least in part on one or more other sidelink communications transmitted by the first UE,
wherein a TPC step size of the plurality of TPC commands is greater relative to a TPC step size of the plurality of other TPC commands based at least in part on at least one of:
the accumulation period occurring at a beginning of a sidelink transmission burst of the UE,
the accumulation period occurring after a transmit beam change of the UE, or
an updated downlink pathloss estimate between the accumulation period and the other accumulation period.

28. The first UE of claim 15, wherein at least one of the first transmit power adjustment or the second transmit power adjustment for the first UE is associated with a TPC loop that is based at least in part on a TPC loop index associated with transmission of the one or more sidelink communications,
wherein the TPC loop index is indicated by at least one of:
a sounding reference signal resource indicator associated with the transmission of the one or more sidelink communications,
a channel state information reference signal resource indicator associated with the transmission of the one or more sidelink communications, or
a waveform type associated with the transmission of the one or more sidelink communications.

29. A non-transitory computer-readable medium storing one or more instructions for wireless communication, the one or more instructions comprising:
one or more instructions that, when executed by one or more processors of a first user equipment (UE), cause the one or more processors to:
receive, during an accumulation period and based at least in part on one or more sidelink communications transmitted by the first UE, a plurality of transmit power control (TPC) commands;
determine a first transmit power adjustment for the first UE, based at least in part on accumulating a first subset of the plurality of TPC commands being associated with a second UE, and a second transmit power adjustment for the first UE based at least in part on accumulating a second subset of the plurality of TPC commands being associated with a third UE; and
selectively adjust a transmit power of the first UE based at least in part on the first transmit power adjustment or the second transmit power adjustment.

30. The non-transitory computer-readable medium of claim 29, wherein the first subset of the plurality of TPC commands comprises a first plurality of TPC commands associated with the second UE and the second subset of the plurality of TPC commands comprises a second plurality of TPC commands associated with the third UE; and
wherein the one or more instructions, that cause the one or more processors to determine the first transmit power adjustment and the second transmit power adjustment for the first UE, cause the one or more processors to:
determine the first transmit power adjustment for the first UE, based at least in part on a combination of the first plurality of TPC commands, and the second transmit power adjustment for the first UE based at least in part on a combination of the second plurality of TPC commands.

31. The non-transitory computer-readable medium of claim 29, wherein the one or more instructions, when executed by the one or more processors, further cause the one or more processors to:
select the first transmit power adjustment or the second transmit power adjustment as the transmit power adjustment for the UE.

32. The non-transitory computer-readable medium of claim 29, wherein a timing of the accumulation period is based at least in part on at least one of:
a received grant triggering an uplink transmission,
a received grant triggering a sidelink transmission,
an access link recurring grant occasion, or
a sidelink configured grant occasion.

33. The non-transitory computer-readable medium of claim 29, wherein the accumulation period includes a plurality of accumulation sub-periods;
wherein the one or more instructions, that cause the one or more processors to receive the plurality of TPC commands, cause the one or more processors to:
receive the first subset of the plurality of TPC commands in a first accumulation sub-period of the plurality of accumulation sub-periods, receive the second subset of the plurality of TPC commands in the first accumulation sub-period,
receive a third subset of the plurality of TPC commands, associated with the second UE, in a second accumulation sub-period of the plurality of accumulation sub-periods, and
receive a fourth subset of the plurality of TPC commands, associated with the third UE, in the second accumulation sub-period; and
wherein the one or more instructions, when executed by the one or more processors, cause the one or more processors to:
determine a total transmit power adjustment for the first UE based at least in part on the first transmit power adjustment and the second transmit power adjustment.

34. The non-transitory computer-readable medium of claim 29, wherein the one or more instructions, that cause the one or more processors to receive the plurality of TPC commands, cause the one or more processors to:
receive a TPC command of the plurality of TPC commands in a medium access control (MAC) control element (MAC-CE); and
wherein the one or more instructions, when executed by the one or more processors, further cause the one or more processors to:
determine whether the TPC command was received during the accumulation period based at least in part on at least one of:
a time at which a physical downlink channel carrying the MAC-CE was received,
a time at which a physical shared channel carrying the MAC-CE was received, or
a time at which an acknowledgement for the MAC-CE was transmitted.

35. The non-transitory computer-readable medium of claim 29, wherein at least one of the first transmit power adjustment or the second transmit power adjustment for the first UE is to increase the transmit power of the first UE; and
wherein the one or more instructions, that cause the one or more processors to selectively adjust the transmit power of the first UE, cause the one or more processors to:
refrain from increasing the transmit power based at least in part on determining that the transmit power of the first UE is set to a maximum permitted transmit power for the first UE.

36. The non-transitory computer-readable medium of claim 29, wherein the one or more instructions, when executed by the one or more processors, further cause the one or more processors to:
reset at least one of the first transmit power adjustment or the second transmit power adjustment for the first UE based at least in part on at least one of:
a beginning of a sidelink transmission burst of the first UE, or
a change to a transmit beam of the first UE.

37. The non-transitory computer-readable medium of claim 29, wherein the one or more instructions, when executed by the one or more processors, further cause the one or more processors to:
receive, during another accumulation period after the accumulation period, a plurality of other TPC commands that are based at least in part on one or more other sidelink communications transmitted by the first UE,
wherein a TPC step size of the plurality of TPC commands is greater relative to a TPC step size of the plurality of other TPC commands based at least in part on at least one of:
the accumulation period occurring at a beginning of a sidelink transmission burst of the UE,
the accumulation period occurring after a transmit beam change of the UE, or
an updated downlink pathloss estimate between the accumulation period and the other accumulation period.

38. The non-transitory computer-readable medium of claim 29, wherein at least one of the first transmit power adjustment or the second transmit power adjustment for the first UE is associated with a TPC loop that is based at least in part on a TPC loop index associated with transmission of the one or more sidelink communications,
wherein the TPC loop index is indicated by at least one of:
a sounding reference signal resource indicator associated with the transmission of the one or more sidelink communications,
a channel state information reference signal resource indicator associated with the transmission of the one or more sidelink communications, or
a waveform type associated with the transmission of the one or more sidelink communications.

39. A first apparatus for wireless communication, comprising:
means for receiving, during an accumulation period and based at least in part on one or more sidelink communications transmitted by the first apparatus, a plurality of transmit power control (TPC) commands;
means for determining a first transmit power adjustment for the first apparatus, based at least in part on accumulating a first subset of the plurality of TPC commands being associated with a second apparatus, and a second transmit power adjustment for the first apparatus based at least in part on accumulating a second subset of the plurality of TPC commands being associated with a third apparatus; and
means for selectively adjusting a transmit power of the first apparatus based at least in part on at least one of the first transmit power adjustment or the second transmit power adjustment.

40. The first apparatus of claim 39, further comprising:
means for selecting the first transmit power adjustment or the second transmit power adjustment as the transmit power adjustment for the first apparatus.

* * * * *